(12) United States Patent
Rathammer et al.

(10) Patent No.: US 11,440,569 B2
(45) Date of Patent: Sep. 13, 2022

(54) COIL DEVICE FOR AN ELECTROMAGNETIC TRACK BRAKE FOR A RAIL VEHICLE, MAGNETIC TRACK BRAKE FOR A RAIL VEHICLE, AND METHOD FOR MOUNTING AT LEAST ONE CONNECTION CABLE OF A COIL OF AN ELECTROMAGNETIC TRACK BRAKE FOR A RAIL VEHICLE

(71) Applicant: KNORR-BREMSE GESELLSCHAFT MIT BESCHRANKTER HAFTUNG, Mödling (AT)

(72) Inventors: Richard Rathammer, Stillfried-Grub (AT); Volker Joergl, Breitenfurt (AT); Marcin Widlinski, Vienna (AT)

(73) Assignee: KNORR-BREMSE GESELLSCHAFT MIT BESCHRANKTER HAFTUNG

( * ) Notice: Subject to any disclaimer, the term of this patent is extended or adjusted under 35 U.S.C. 154(b) by 0 days.

(21) Appl. No.: 15/307,559

(22) PCT Filed: Apr. 28, 2015

(86) PCT No.: PCT/EP2015/059130
§ 371 (c)(1),
(2) Date: Dec. 5, 2016

(87) PCT Pub. No.: WO2015/165866
PCT Pub. Date: Nov. 5, 2015

(65) Prior Publication Data
US 2017/0080959 A1 Mar. 23, 2017

(30) Foreign Application Priority Data
Apr. 29, 2014 (DE) .................... 10 2014 208 112.2

(51) Int. Cl.
*B60T 13/74* (2006.01)
*F16D 63/00* (2006.01)
(Continued)

(52) U.S. Cl.
CPC ............ *B61H 7/083* (2013.01); *B60T 13/748* (2013.01); *F16D 63/002* (2013.01); *H02K 49/04* (2013.01)

(58) Field of Classification Search
CPC ..... B60T 13/748; B61H 7/083; F16D 63/002; H02K 49/04
(Continued)

(56) References Cited

U.S. PATENT DOCUMENTS 2,366,029 A * 12/1944 Hines .................. B60L 7/00
105/61
2,760,798 A * 8/1956 Evans .................. H01R 4/183
174/94 R
(Continued)

FOREIGN PATENT DOCUMENTS

| CA | 679495 A | 2/1964 |
| CN | 1314682 A | 9/2001 |

(Continued)

OTHER PUBLICATIONS

Search report for International Patent Application No. PCT/EP2015/059130, dated Oct. 22, 2015.
(Continued)

*Primary Examiner* — Bradley T King
*Assistant Examiner* — James K Hsiao
(74) *Attorney, Agent, or Firm* — Barnes & Thornburg LLP

(57) ABSTRACT

The invention relates to a coil device for an electromagnetic track brake for a rail vehicle. The coil device has a winding wire, which has a first end and a second end. The coil device
(Continued)

is the first end of the winding wire is formed as a first coil connection for establishing an electrically conductive joint connection to a first connection cable and/or the second end of the winding wire is formed as a second coil connection for establishing an electrically conductive joint connection to a second connection cable.

11 Claims, 4 Drawing Sheets

(51) Int. Cl.
    *B61H 7/08*      (2006.01)
    *H02K 49/04*      (2006.01)

(58) Field of Classification Search
    USPC .......................................................... 336/192
    See application file for complete search history.

(56) References Cited

U.S. PATENT DOCUMENTS

| | | | | |
|---|---|---|---|---|
| 2,926,030 | A * | 2/1960 | Rozmus | B23K 33/006 285/288.3 |
| 3,417,366 | A * | 12/1968 | Holton | H01R 4/12 174/75 R |
| 3,426,520 | A * | 2/1969 | Osterreicher | D01H 7/22 57/88 |
| 3,585,450 | A * | 6/1971 | Lane | H01F 41/10 310/194 |
| 3,609,616 | A * | 9/1971 | Dumeige | H01R 4/185 336/192 |
| 5,439,075 | A * | 8/1995 | Skalski | B66B 1/44 187/298 |
| 5,584,122 | A * | 12/1996 | Kato | H01R 13/5216 174/84 R |
| 5,869,784 | A * | 2/1999 | Shinchi | H01R 13/514 174/84 R |
| 5,952,750 | A * | 9/1999 | Yokoyama | F16D 27/105 192/12 D |
| 6,127,912 | A * | 10/2000 | Dust | H01F 5/02 336/198 |
| 6,255,592 | B1 * | 7/2001 | Pennington | E21B 17/206 174/103 |
| 6,313,407 | B1 * | 11/2001 | Shinchi | B29C 65/08 174/84 R |
| 6,374,814 | B1 * | 4/2002 | Cook | F16K 31/06 123/568.21 |
| 6,576,842 | B2 * | 6/2003 | Ishii | H01R 43/0207 174/84 R |
| 6,590,487 | B2 * | 7/2003 | Uchiyama | B29C 45/14073 29/602.1 |
| 6,598,293 | B1 * | 7/2003 | Ide | H01R 9/0509 174/74 R |
| 6,798,328 | B2 * | 9/2004 | Uchiyama | H01F 5/02 336/198 |
| 6,961,991 | B2 * | 11/2005 | Fuseya | B29C 45/14639 219/671 |
| 7,038,563 | B2 * | 5/2006 | Andoh | H01H 50/443 335/126 |
| RE40,484 | E * | 9/2008 | Kelly | B61H 9/00 104/246 |
| 7,598,646 | B2 * | 10/2009 | Cleveland | B62J 6/06 310/156.43 |
| 7,806,242 | B2 | 10/2010 | Lehmann et al. | |
| 7,866,449 | B2 * | 1/2011 | Lehmann | B61H 7/08 188/165 |
| 7,915,987 | B2 * | 3/2011 | Qu | G06F 1/26 29/602.1 |
| 8,635,770 | B2 * | 1/2014 | Warner | H01B 7/282 174/94 R |
| 2001/0043450 | A1 * | 11/2001 | Seale | F01L 9/04 361/160 |
| 2004/0066265 | A1 * | 4/2004 | Saito | H01F 17/04 336/200 |
| 2005/0082931 | A1 * | 4/2005 | Burgbacher | H02K 3/522 310/179 |
| 2007/0001576 | A1 * | 1/2007 | Benedix | H01J 1/44 313/317 |
| 2010/0007223 | A1 * | 1/2010 | Denne | H02K 3/26 310/12.22 |
| 2014/0377079 | A1 * | 12/2014 | Gieras | F04B 35/04 417/15 |

FOREIGN PATENT DOCUMENTS

| | | |
|---|---|---|
| CN | 1953894 A | 4/2007 |
| CN | 101710534 A | 5/2010 |
| CN | 102856049 A | 1/2013 |
| DE | 1816367 | 7/1969 |
| DE | 2844996 A1 | 4/1980 |
| DE | 19619409 A1 | 11/1997 |
| DE | 10 2004 018 010 B3 | 10/2005 |
| DE | 10 2013002075 A1 | 8/2013 |
| EP | 1174890 A2 | 1/2002 |
| FR | 2390318 A1 | 12/1978 |
| GB | 1190880 | 5/1970 |
| JP | H11162748 A | 6/1999 |
| RU | 1044520 A | 9/1983 |

OTHER PUBLICATIONS

German Examination Report for corresponding German Application 10 2014 208 112.2 dated Apr. 1, 2015.
Norm DIN EN 60352-2 Ausgabedatum: Apr. 2014. Lötfreie Verbindungen—Teil 2: Crimpverbindungen; Standard DIN EN 60352-2 Issued on: Apr. 2014. Solder-free connections—Part 2: Crimp connections.
Chinese Office Action corresponding to 201580023006.3, dated May 30, 2018.
Russian Office Action corresponding to 2016146402/11, dated Feb. 27, 2018.

* cited by examiner

COIL DEVICE FOR AN ELECTROMAGNETIC TRACK BRAKE FOR A RAIL VEHICLE, MAGNETIC TRACK BRAKE FOR A RAIL VEHICLE, AND METHOD FOR MOUNTING AT LEAST ONE CONNECTION CABLE OF A COIL OF AN ELECTROMAGNETIC TRACK BRAKE FOR A RAIL VEHICLE

PRIORITY CLAIM

This patent application is a U.S. National Phase of International Patent Application No. PCT/EP2015/059130 filed 28 Apr. 2015, which claims priority to German Patent Application No. 10 2014 2018 112, filed 29 Apr. 2014, the disclosures of which are incorporated herein by reference in their entirety.

FIELD

Disclosed embodiments relate to a col device for an electromagnetic track brake for a rail vehicle, to a magnetic track brake for a rail vehicle, and to a method for mounting at least one connection cable of a coil of an electromagnetic track brake for a rail vehicle.

BACKGROUND

In the case of an electromagnetic track brake, the coil of the electromagnetic track brake can usually be connected to a connection cable using a metal sheet which is connected to a coil winding wire, a connection pin and a cable shoe which can be fixed to the connection pin. DE 10 2004 018 010 B3 describes a magnetic track brake device of a rail vehicle.

SUMMARY

Disclosed embodiments provide an improved coil device for an electromagnetic track brake for a rail vehicle, an improved magnetic track brake for a rail vehicle, and an improved method for mounting at least one connection cable of a coil of an electromagnetic track brake for a rail vehicle.

This may be achieved by a coil device for an electromagnetic track brake for a rail vehicle, a magnetic track brake for a rail vehicle, and a method for mounting at least one connection cable of a coil of an electromagnetic track brake for a rail vehicle.

BRIEF DESCRIPTION OF THE FIGURES

Disclosed embodiments are explained in greater detail below with reference to the appended drawings, in which.

DETAILED DESCRIPTION

Figure 1:
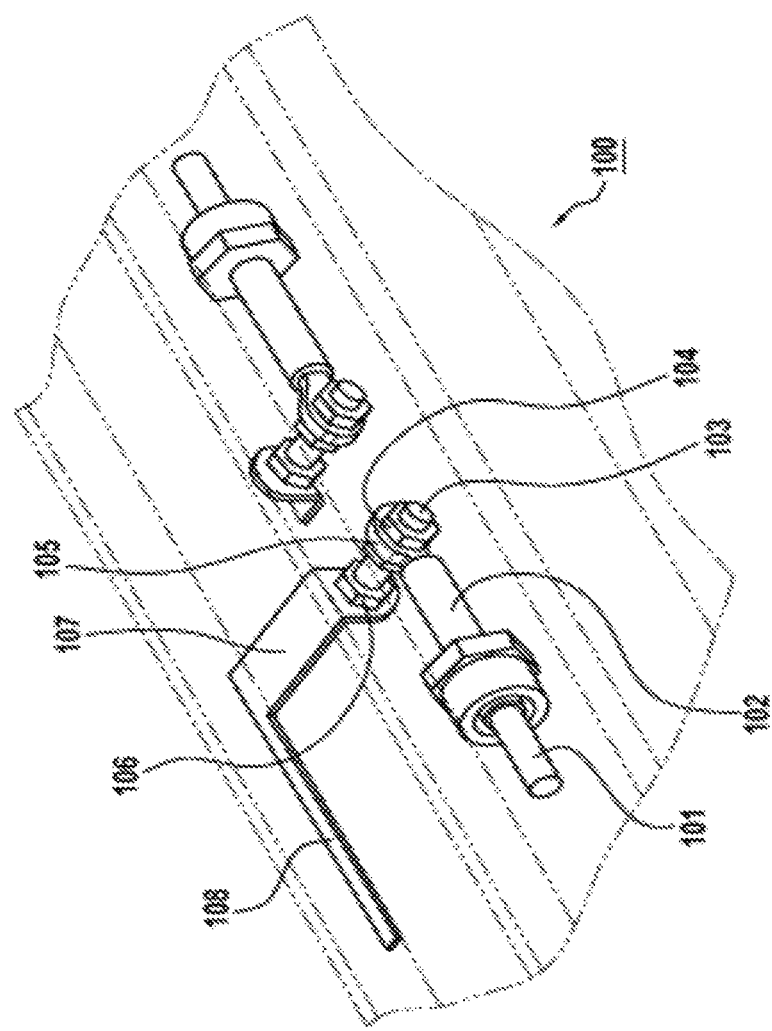
FIG. 1 is an illustration of a portion of a coil of an electromagnetic track brake.

In the case of an electromagnetic track brake, it is possible, according to disclosed embodiments, in particular for a winding wire of a coil to be mechanically and electrically directly connected to a connection cable. For example, in particular a direct electrical connection between connection cable and winding wire of the coil can be provided using a joining connection or pinch connection, for example, by crimping.

Therefore, an expedient coil connection which saves installation space and components can advantageously be provided. As a result, failure potential may be reduced and potential electrical transfer resistance is minimized. In addition to the saving in installation space, expenditure and parts required, a hazard due to thermal damage owing to cohesive connections, such as soldering or welding for example, can advantageously be avoided in particular.

Disclosed embodiments provide a coil device for an electromagnetic track brake for a rail vehicle, wherein the coil device has a winding wire with a first end and a second end, characterized in that the first end of the winding wire is formed as a first coil connection for establishing an electrically conductive joining connection to a first connection cable and/or the second end of the winding wire is formed as a second coil connection for establishing an electrically conductive joining connection to a second connection cable.

A rail vehicle can generally be understood to mean a railborne vehicle, such as a locomotive, a multiple unit, a railcar, a tram, a subway vehicle, a railway car such as a passenger car or railroad car and/or freight car or the like. The coil device can have an electrical coil comprising a plurality of windings or turns of the winding wire. The winding wire can therefore be wound in the coil device or coil to form a plurality of windings or turns. The first end and the second end of the winding wire can be arranged in a connection region of the coil device.

According to one embodiment, the first end of the winding wire and the second end of the winding wire can be arranged such that they cross over. In this case, the first end of the winding wire and the second end of the winding wire can be arranged at a distance from one another. An embodiment of this kind has the advantage that crossing over of the turns can be easily realized and therefore the last turn of the coil is complete, so that flux through the turn is increased. A braking effect of an electromagnetic track brake can be further increased using a coil device of this kind.

Disclosed embodiments provide an electromagnetic track brake for a rail vehicle, characterized in that the track brake has at least one embodiment of the abovementioned coil device.

In conjunction with the electromagnetic track brake, one embodiment of the abovementioned coil device can advantageously be employed or used in order to optimize a braking effect together with a design which is simplified and reduced in size. The electromagnetic track brake may be what is known as an eddy current brake. The coil device can be part of a rigid magnet or the like. The coil device can be capable of being attached in a movable manner to the rail vehicle using a suspension device. The electromagnetic track brake can have at least one coil device.

According to at least one embodiment, the first connection cable can be connected to the first coil connection using an electrically conductive joining connection between the first coil connection and an end of a first connection cable using a first pinch sleeve and/or a first shrink tube. As an alternative or in addition, the second connection cable can be connected to the second coil connection using an electrically conductive joining connection between the second coil connection and an end of a second connection cable using a second pinch sleeve and/or a second shrink tube. Each of the pinch sleeves can be designed in order to receive a connection cable and/or a coil connection and to be joined or pinch-connected to the connection cable or coil connection for the purpose of establishing an electrically conductive joining connection or pinch connection. Each of the shrink tubes can be designed in order to sheath a joining point at which a connection cable, a pinch sleeve and a coil connection are joined to one another. The shrink tubes can be formed from an electrically insulating material. An embodiment of this kind has the advantage that it electrically conductive joining connections can be established in a particularly simple and reliable manner using the pinch sleeves and can be electrically insulated in an uncomplicated manner using the shrink tubes.

The first pinch sleeve and/or the second pinch sleeve can also have butt connectors or parallel connectors. In this case, a pinch sleeve, which is formed as a butt connector, can be designed in order to receive a coil connection and an end of a connection cable such that the latter butt against one another end-to-end or axially. A pinch sleeve, which is formed as a parallel connector, can be designed in order to receive a coil connection and an end of a connection cable such that end sections thereof overlap. An embodiment of this kind has the advantage that a suitable type of connector can be selected depending on conditions and requirements of a planned application.

Disclosed embodiments provide a method for mounting at least one connection cable of a coil of an electromagnetic track brake for a rail vehicle, characterized by an operation of providing at least one embodiment of the abovementioned coil device, at least one first connection cable and also at least one second connection cable, and a step of establishing an electrically conductive joining connection between the first coil connection and an end of the first connection cable and/or an electrically conductive joining connection between the second coil connection and an end of the second connection cable.

The method can be executed using at least one embodiment of the abovementioned coil device in order to advantageously mount and, respectively, in particular to make electrical contact with the at least one connection cable of the coil of an electromagnetic track brake.

According to one embodiment, in the operation of establishing the electrically conductive joining connection, the first coil connection and the end of the first connection cable can be arranged such that they overlap or butt against one another. As an alternative or in addition, in the operation of establishing the electrically conductive joining connection, the second coil connection and the end of the second connection cable can be arranged such that they overlap or butt against one another. An embodiment of this kind has the advantage that a suitable manner of connection can be carried out depending on conditions and requirements of a planned application.

Furthermore, in the operation of establishing the electrically conductive joining connection, the first coil connection and the end of the first connection cable can be arranged and joined to one another in a first pinch sleeve. As an alternative or in addition, in the operation of establishing the electrically conductive joining connection, the second coil connection and the end of the second connection cable can be arranged and joined to one another in a second pinch sleeve. An embodiment of this kind has the advantage that the electrically conductive joining connection can be established in a reliable and uncomplicated manner together with a low level of expenditure.

In addition, in the operation of establishing the electrically conductive joining connection, shrink tubes can be arranged on the coil connections and the ends of the connection cables in order to electrically insulate the electrically conductive joining connections. In this case, each of the shrink tubes can be arranged such that a joining point, at which a connection cable, a pinch sleeve and a coil connection are joined to one another, is sheathed by the shrink tube. An embodiment of this kind has the advantage that the electrically conductive joining connections can be electrically insulated in a simple and cost-effective manner.

In the following description of disclosed embodiments, identical or similar reference symbols are used for the elements which are illustrated in the different drawings and act in a similar manner, the elements not being repeatedly described.

FIG. 1 is an illustration of a portion of a coil 100 of an electromagnetic track brake for a rail vehicle. FIG. 1 shows in each case two of the following elements, wherein, for reasons of space, only one connection cable 101, one shrink tube 102, one connection pin 103, one hexagonal nut 104, one cable shoe 105, one further hexagonal nut 106, one metal connection plate 107 and one winding wire 108 are provided with reference symbols.

The connection cable 101 is pinched with the tubular cable shoe 105 and electrically insulated by the shrink tube 102. The connection cable 101 which is connected to the tubular cable shoe 105 is screwed to a prefabricated connection pin. The prefabricated connection pin consists of the metal connection plate 107 or copper plate which is screwed and soldered to the connection pin 103, the hexagonal nut 104 and also the further hexagonal nut 106, which hexagonal nuts allow force-fitting fixing of the tubular cable shoe 105 to the connection pin 103, and the metal connection plate 107 which allows the prefabricated connection pin to be cohesively connected to the winding wire 108.

Figure 2:
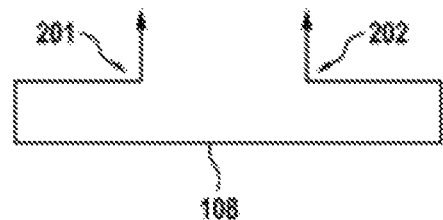
FIG. 2 is a schematic illustration of a winding wire of a coil.

FIG. 2 is a schematic illustration of a winding wire 108 of a coil. In particular, FIG. 2 symbolizes what is known as a last turn of the winding wire 108 in the coil. The winding wire 108 is a winding wire such as the winding wire of the coil of the electromagnetic track brake from FIG. 1. The FIG. 2 shows a first end 201 of the winding wire 108 and a second end 202 of the winding wire 108. The first end 201 and the second end 202 are arranged substantially parallel to one another here, wherein the last turn of the winding wire 108 or of the coil is incomplete. Therefore, the turns or the ends 201 and 202 of the winding wire 108 do not cross over.

Figure 3:
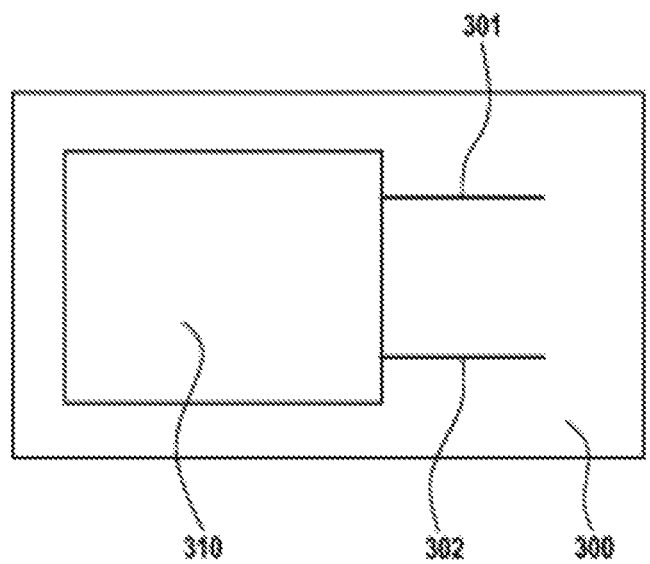
FIG. 3 is a schematic illustration of an electromagnetic track brake comprising a coil device according to a disclosed embodiment.

FIG. 3 is a schematic illustration of an electromagnetic track brake for a rail vehicle comprising a coil device according to a disclosed embodiment. The Figure shows the electromagnetic track brake 300, a first connection cable 301, a second connection cable 302 and, merely by way of example, a coil device 310. The first connection cable 301 and the second connection cable 302 are connected to the coil device 310. According to another exemplary embodiment, the electromagnetic track brake 300 has a plurality of coil devices 310.

The electromagnetic track brake 300 is, in particular, an eddy current brake or the like. The coil device 310 is, for example, part of a rigid magnet or the like. The coil device 300 has an electrical coil having a plurality of windings or turns of a winding wire. The electromagnetic track brake 300 or the coil device 310 can be attached in a movable manner to the rail vehicle using a suspension device for example. Here, the rail vehicle is a railborne vehicle, such as a locomotive, a multiple unit, a tram, a railway car or the like.

Even though not explicitly shown in FIG. 3, the coil device 310 therefore has a winding wire with a first end and a second end. In this case, the first end of the winding wire is formed as a first coil connection for establishing an electrically conductive joining connection to a first connection cable, and the second end of the winding wire is formed as a second coil connection for establishing an electrically conductive joining connection to a second connection cable. The coil device 310 will be discussed further in the text which follows.

Figure 4:
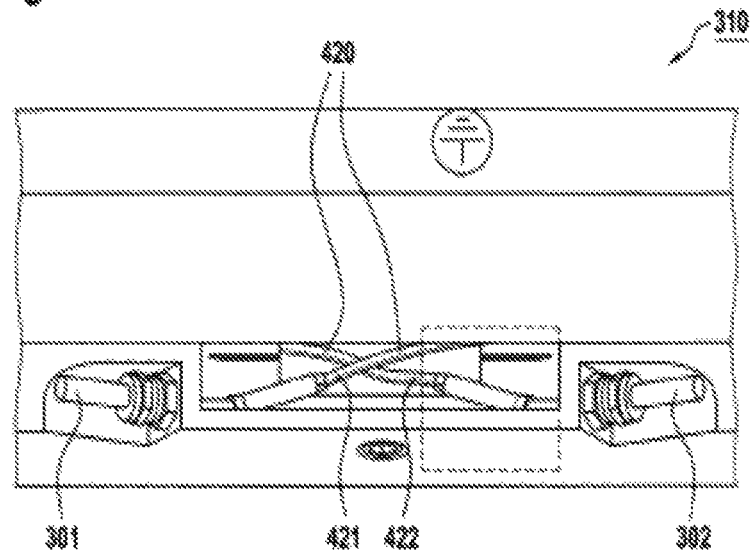
FIG. 4 is an illustration of a portion of a coil device of an electromagnetic track brake according to a disclosed embodiment.

FIG. 4 is an illustration of a portion of a coil device of an electromagnetic track brake for a rail vehicle according to at least one disclosed embodiments. The Figure shows a first connection cable 301, a second connection cable 302, the coil device 310, a winding wire 420, a first end 421 of the winding wire 420, and a second end 422 of the winding wire 420. The coil device 310 is a coil device such as the coil device from FIG. 3.

The coil device 310 has the winding wire 420 with the first end 421 and the second end 422. The winding wire 420 is wound in the coil device 310 to form a plurality of winding or turns in order to realize a coil. The first end 421 and the second end 422 of the winding wire 420 are arranged in a connection region of the coil device 310 here. The first end 421 of the winding wire 420 and the second end 422 of the winding wire 420 are arranged such that they cross over.

In this case, the first end 421 of the winding wire 420 is formed as a first coil connection for establishing a first electrically conductive joining connection to the first connection cable 301. The first end 421 of the winding wire 420 is electrically conductively joined to the first connection cable 301 at a first joining point. Furthermore, the second end 422 of the winding wire 420 is formed as a second coil connection for establishing a second electrically conductive joining connection to the second connection cable 302. The second end 422 of the winding wire 420 is electrically conductively joined to the second connection cable 302 at a second joining point. The first joining connection and the second joining connection are similar or identical here. The joining connections or joining points are described below using the example of the second joining connection or joining point in FIG. 5.

Figure 5:
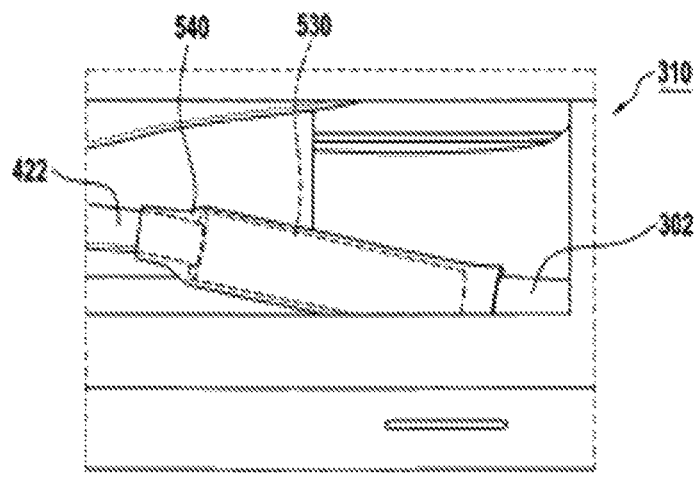
FIG. 5 is an enlarged illustration of a subsection of the coil device from FIG. 4.

FIG. 5 is an enlarged illustration of a subsection of the coil device from FIG. 4. More precisely, FIG. 5 is an enlarged illustration of the second joining connection or joining point from FIG. 4. Here, the second connection cable 302, the coil device 310, the first end 422 of the winding wire, a crimp sleeve or pinch sleeve 530 and a shrink tube 540 are illustrated in FIG. 5.

The pinch sleeve 530 is designed in order to receive an end, which is stripped of insulation, of a connection cable, here the second connection cable 302, and an end, here the second end 422, of the winding wire and to be joined or pinch-connected to the ends for the purpose of establishing the electrically conductive joining connection or pinch connection. The shrink tube 540 is designed in order to sheath the joining point, here the second joining point, at which the second connection cable 302 and the second end 422 of the winding wire are joined to one another using the pinch sleeve 530, for the purpose of electrically insulating the joining point. The shrink tube 540 is formed from an electrically insulating material.

The second end 422 of the winding wire and the second connection cable 302 are electrically conductively joined to one another using the second joining connection or at the second joining point. In this case, the second end 422 of the winding wire and an end, which is stripped of insulation, of the second connection cable 302 are received in the pinch sleeve 530 and joined or press-connected to one another.

In this case, the pinch sleeve 530 is formed as a butt connector according to at least one disclosed embodiment as illustrated in FIG. 4 or FIG. 5. In this case, the second end 422 of the winding wire and the end, which is stripped of insulation, of the second connection cable 301 are received in the pinch sleeve 530 such that the ends butt against one another axially or end-to-end.

According to another disclosed embodiment, the pinch sleeve 530 can be formed as a parallel connector. In this case, the second end 422 of the winding wire and the end, which is stripped of insulation, of the second connection cable 301 can be received in the pinch sleeve 530 such that end sections of the ends overlap.

In other words, the second connection cable 302 is pinched together or crimped to the second end 422 of the winding wire directly using the pinch sleeve 530. The pinch sleeve 530 may be in the form of a parallel connector or butt connector. The shrink tube 540 is designed in order to allow electrical insulation of the pinch point or joining point.

Figure 6:
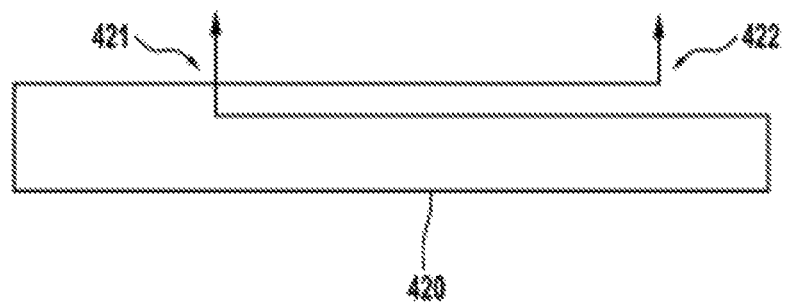
FIG. 6 is a schematic illustration of a winding wire of a coil device of an electromagnetic track brake according to a disclosed embodiment.

FIG. 6 is a schematic illustration of a winding wire 420 of a coil device of an electromagnetic track brake according to a disclosed embodiment. In particular, FIG. 6 symbolizes what is known as a last turn of the winding wire 420 in the coil device. The winding wire 420 is a winding wire such as the winding wire of the coil device of the electromagnetic track brake from FIG. 4 or FIG. 5. The FIG. 6 shows the first end 421 of the winding wire 420 and the second end 422 of the winding wire 420.

Here, the first end 421 of the winding wire 420 and the second end 422 of the winding wire 420 are arranged such that they cross over. Therefore, crossing over of the turns or the ends 421 and 422 of the winding wire 420 is realized and the last turn of the coil device is complete, so that flux through the turn is increased.

Figure 7:
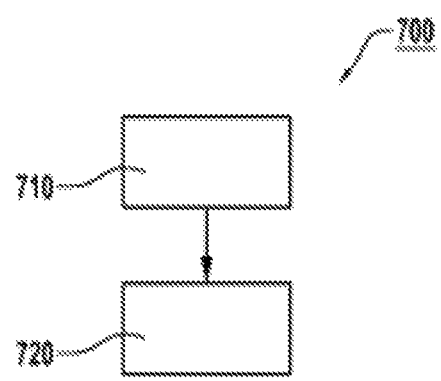
FIG. 7 is a flowchart of a method for mounting at least one connection cable of a coil of an electromagnetic track brake according to a disclosed embodiment.

FIG. 7 is a flowchart of a method 700 for mounting at least one connection cable of a coil of an electromagnetic track brake according to a disclosed embodiment. An electromagnetic track brake such as the electromagnetic track brake described and illustrated in FIG. 3 can be produced by executing the method 700.

The method 700 has an operation 710 of providing at least one coil device, at least one first connection cable and also at least one second connection cable. In this case, the coil device has a winding wire with a first end and a second end. The first end of the winding wire is formed as a first coil connection for establishing an electrically conductive joining connection to the first connection cable, and the second end of the winding wire is formed as a second coil connection for establishing an electrically conductive joining connection to the second connection cable. The coil device is, for example, the coil device from one of FIGS. 3 to 5.

The method 700 also has an operation 720 of establishing an electrically conductive joining connection between the first coil connection and an end of the first connection cable and an electrically conductive joining connection between the second coil connection and an end of the second connection cable. Here, according to the disclosed embodiment illustrated in FIG. 7, in operation 720 of establishing the electrically conductive joining connection, the first coil connection and the end of the first connection cable are arranged such that they overlap or butt against one another, and the second coil connection and the end of the second connection cable are arranged such that they overlap or butt against one another. Furthermore, in operation 720 of establishing the electrically conductive joining connection, the first coil connection and the end of the first connection cable are arranged and joined to one another in a first pinch sleeve, and the second coil connection and the end of the second connection cable are arranged and joined to one another in a second pinch sleeve. In addition, in operation 720 of establishing the electrically conductive joining connection, shrink tubes are arranged on the coil connections and the ends of the connection cables in order to electrically insulate the electrically conductive joining connections.

The described exemplary embodiments are selected merely by way of example and can be combined with one another.

LIST OF REFERENCE SYMBOLS

100 Coil
101 Connection cable
102 Shrink tube
103 Connection pin
104 Hexagonal nut
105 Cable shoe
106 Further hexagonal nut
107 Metal connection plate
108 Winding wire
201 First end of the winding wire
202 Second end of the winding wire
300 Electromagnetic track brake
301 First connection cable
302 Second connection cable
310 Coil device
420 Winding wire
421 First end of the winding wire
422 Second end of the winding wire
530 Pinch sleeve
540 Shrink tube
700 Method for mounting at least one connection cable of a coil
710 Operation of providing the at least one coil device
720 Operation of establishing the electrically conductive joining connection

The invention claimed is:

1. A coil device assembly for an electromagnetic track brake for a rail vehicle, the coil device assembly comprising:
    a winding wire having a first end and a second end, wherein the first end of the winding wire is formed as a first coil connection for establishing an electrically conductive joining connection to a first connection cable and/or the second end of the winding wire is formed as a second coil connection for establishing an electrically conductive joining connection to a second connection cable; and
    a pinch sleeve having a first opening and a second opening and a sleeve extending between and connecting the first opening and the second opening, wherein the pinch sleeve receives the first or second end through one end of the sleeve at the first opening and the corresponding first or second connection cable through an opposite end of the sleeve through the second opening to establish the electrically conductive joining connection,
    wherein the pinch sleeve is a butt connector and the electrically conductive joining connection is formed so that the coil connection and the end of the connection cable butt against each other end-to-end, and
    wherein the electrically conductive joining connection includes an electrically insulating shrink tube on the coil connection and the end of the connection cable to surround the pinch sleeve and electrically insulate the electrically conductive joining connection.

2. The coil device assembly of claim 1, wherein the first end of the winding wire and the second end of the winding wire cross one another.

3. The coil device of claim 1, wherein the first end of the winding wire and the second end of the winding wire are arranged such they can cross one another.

4. An electromagnetic track brake for a rail vehicle, the electromagnetic track brake comprising:
    at least one coil device assembly including a winding wire having a first end and a second end, wherein the first end of the winding wire is formed as a first coil connection for establishing an electrically conductive joining connection to a first connection cable and/or the second end of the winding wire is formed as a second coil connection for establishing an electrically conductive joining connection to a second connection cable; and
    a pinch sleeve having a first opening and a second opening and a sleeve extending between and connecting the first opening and the second opening, wherein the pinch sleeve receives the first or second end and the corresponding first or second connection cable at the first opening through one end of the sleeve and which receives a first connection cable and/or second connection cable at the second opening through an opposite end of the sleeve to establish the electrically conductive joining connection.

5. The electromagnetic track brake of claim 4, wherein the first connection cable is connected to the first coil connection by the electrically conductive joining connection between the first coil connection the end of the first connection cable using a first pinch sleeve and the second connection cable is connected to the second coil connection by the electrically conductive joining connection between the second coil connection and the end of the second connection cable using a second pinch sleeve.

6. The electromagnetic track brake of claim 5, wherein the first pinch sleeve and/or the second pinch sleeve have butt connectors or parallel connectors.

7. A method for mounting at least one connection cable of a coil device of an electromagnetic track brake for a rail vehicle, the method comprising:
    providing at least the coil device including a winding wire having a first end and a second end, wherein the first end of the winding wire is formed as a first coil connection for establishing an electrically conductive joining connection to a first connection cable and/or the second end of the winding wire is formed as a second coil connection for establishing an electrically conductive joining connection to a second connection cable;
    providing at least one first connection cable and at least one second connection cable; and
    establishing an electrically conductive joining connection between the first coil connection and an end of the first connection cable and/or an electrically conductive joining connection between the second coil connection and an end of the second connection cable, wherein the electrically conductive joining connection is provided using a pinch sleeve having two openings and a sleeve extending between and connecting the two openings, the pinch sleeve receives the first or second end in one of the two openings and the corresponding first or second connection cable in a second of the two openings, and wherein establishment of the electrically conductive joining connection includes arranging electrically insulating shrink tubes on the coil connections and the ends of the connection cables to surround the pinch sleeve and electrically insulate the electrically conductive joining connections.

8. The method of claim 7, wherein the establishment of the electrically conductive joining connection includes arranging the first coil connection and the end of the first connection cable such that they overlap or butt against one another and/or the second coil connection and the end of the second connection cable are arranged to overlap or butt against one another.

9. The method of claim 8, wherein the establishment of the electrically conductive joining connection includes arranging and joining the first coil connection and the end of the first connection cable in a first pinch sleeve, and/or arranging and joining the second coil connection and the end of the second connection in a second pinch sleeve.

10. The method of claim 8, wherein the pinch sleeve is a butt connector and the electrically conductive joining connection is formed so that the coil connection and the end of the connection cable butt against each other end-to-end.

11. The method claim 7, wherein the establishment of the electrically conductive joining connection includes arranging and joining the first coil connection and the end of the first connection cable in a first pinch sleeve, and/or arranging and joining the second coil connection and the end of the second connection cable in a second pinch sleeve.

* * * * *